(12) United States Patent
Forecast

(10) Patent No.: US 8,990,799 B1
(45) Date of Patent: Mar. 24, 2015

(54) DIRECT MEMORY ACCESS THROUGH VIRTUAL SWITCH IN DEVICE DRIVER

(75) Inventor: John Forecast, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 1497 days.

(21) Appl. No.: 12/022,268

(22) Filed: Jan. 30, 2008

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | | |
|---|---|---|---|---|
| 5,550,816 A * | 8/1996 | Hardwick et al. | ............ | 370/397 |
| 5,812,775 A * | 9/1998 | Van Seters et al. | ............ | 709/213 |
| 7,660,306 B1 * | 2/2010 | Eiriksson et al. | ............ | 370/392 |
| 7,711,900 B2 * | 5/2010 | Booth et al. | ................. | 711/130 |
| 7,721,299 B2 * | 5/2010 | van Riel | ......................... | 719/319 |
| 7,996,569 B2 * | 8/2011 | Aloni et al. | .................... | 709/250 |
| 2006/0005185 A1 * | 1/2006 | Nguyen | ............................. | 718/1 |
| 2006/0045089 A1 * | 3/2006 | Bacher et al. | ................. | 370/392 |
| 2007/0244972 A1 * | 10/2007 | Fan | ................................ | 709/205 |
| 2008/0271134 A1 * | 10/2008 | Johnson et al. | ................. | 726/13 |

* cited by examiner

*Primary Examiner* — Abdullah Al Kawsar
*Assistant Examiner* — James J Lee
(74) *Attorney, Agent, or Firm* — Anderson Gorecki & Rouille LLP

(57) ABSTRACT

A virtual switch implemented in a NIC routes packets to a specific virtual machine of a group of supported virtual machines based on a unique MAC address assigned to that virtual machine. Packets which are addressed to the broadcast or a multicast address may be copied to all virtual machines associated with the virtual switch or may be passed to the NIC device driver so that it may be copied by software. The NIC operates in a selective mode whereby packets that are not addressed to a supported virtual machine are rejected or discarded. Further, the virtual switch routes the packets to the virtual machines by performing a DMA copy operation to dedicated memory associated with the virtual machine to which the packet is addressed. The NIC may also include dedicated memory for each supported MAC address in order to facilitate operation.

9 Claims, 4 Drawing Sheets

DIRECT MEMORY ACCESS THROUGH VIRTUAL SWITCH IN DEVICE DRIVER

FIELD OF THE INVENTION

This invention is generally related to the field of Network Attached Storage, and more particularly to direct memory access to virtual machine dedicated memory through a virtual switch in a device driver of a Network Interface Card.

BACKGROUND OF THE INVENTION

FIG. 1 illustrates a prior art architecture for a networked device (100) that performs functions associated with Network Attached Storage (NAS). The device includes a plurality of virtual machines (VM) (102), a virtual switch (VS) (104), and a plurality of Network Interface Cards (NICs) (106). Each virtual machine (102) is associated with a unique (within the Local Area Network) Media Access Control (MAC) address. The virtual switch (104), which is implemented in the host operating system (108), functions to direct incoming packets (110) to the appropriate virtual machine (102) based on the MAC address in the packet header. In particular, the network interface card (106) receives the packet from the network and copies the packet to a common buffer pool (112). The virtual switch (104) then examines the packet from the common buffer pool to perform the switching function. In particular, the virtual switch categorizes packets by destination MAC address. The virtual switch then directs the packet to be copied to virtual machine memory based on the results of the categorization. If the packet is addressed to MAC address 1, then the virtual switch prompts the packet to be copied from the common buffer pool to a buffer pool reserved for use by the virtual machine having MAC address 1. If the packet is addressed to MAC address 2, then the virtual switch prompts the packet to be copied from the common buffer pool to a buffer pool reserved for use by the virtual machine having MAC address 2. If the packet is addressed to the broadcast address or a multicast address, then the virtual switch prompts the packet to be copied from the common buffer pool to the buffer pools reserved for use by all virtual machines associated with the virtual switch. If the packet is addressed to a MAC address that is not associated with a virtual machine running in the device, the virtual switch filters the packet, i.e., prompts discard of the packet from the common buffer pool.

Because the virtual switch is implemented in the operating system, the physical NICs are configured in "promiscuous mode." In particular, the NICs are configured to receive packets addressed to all MAC addresses in order for the device to support the various MAC addresses associated with the supported virtual machines. One drawback of this compromise is that performance degrades in proportion to the number of packets received by the NICs that are not addressed to virtual machines supported by the device. While the number of packets unnecessarily received and processed by the device can be reduced by selective transmission by other network devices, the problem may still become troublesome when packet flooding occurs, such as happens following a network topology change. Further, copying packets from the common buffer to the reserved memory associated with particular virtual machines can be time consuming and costly in terms of both processor cycles and processor cache occupancy.

SUMMARY OF THE INVENTION

In accordance with one embodiment of the invention, apparatus for use in a communications network comprises: at least one processor providing a plurality of virtual machines, each virtual machine having dedicated memory and an address that is unique within the network; a network interface device operative to support multiple virtual machines, the network interface including a virtual switch operative in response to receipt of a protocol data unit to identify a destination address specified by the data unit, and to copy the data unit directly to the dedicated memory of the virtual machine to which the data unit is addressed.

In accordance with another embodiment of the invention, computer program code stored on computer readable media which is executed by a computer comprises: a plurality of virtual machines, each virtual machine having dedicated memory and an address; a virtual switch executed by a network interface device operative to support multiple virtual machines, the virtual switch operative in response to receipt of a protocol data unit to identify a destination address specified by the data unit, and to copy the data unit directly to the dedicated memory of the virtual machine to which the data unit is addressed.

In accordance with another embodiment of the invention, a method for use in a communications network comprises: running a plurality of virtual machines, each virtual machine having dedicated memory and an address; and with a network interface device including a virtual switch, in response to receipt of a protocol data unit: identifying a destination address specified by the data unit, and copying the data unit directly to the dedicated memory of the virtual machine to which the data unit is addressed.

An advantage of the invention is that the network interface devices, e.g., NICs, can be configured in a selective receive mode. A virtual switch filtering function compares the MAC addresses of supported virtual machines, or portions thereof, with the MAC addresses of incoming packets to determine whether the packets are destined for a supported virtual machine. Packets which are addressed to a MAC address that is not associated with one of the virtual machines supported by the NIC are discarded without being forwarded to a common memory buffer pool. The virtual switch filtering function thus enables the NIC to be configured in a selective mode, rather than a promiscuous mode.

Another advantage of the invention is reducing the number of copying operations required to provide a packet to the appropriate virtual machine. By switching on the basis of MAC address, the virtual switch of the NIC is able to copy a packet directly to dedicated memory associated with the virtual machine having the MAC address specified by the packet. In particular, the virtual switch performs a direct memory access (DMA) operation by which the packet is copied to the private buffer pool associated with the MAC address specified in the packet, possibly without assistance of the processor associated with the device.

Further features and advantages of the invention will become more readily apparent from the following detailed description when taken in conjunction with the accompanying drawings.

DETAILED DESCRIPTION

Figure 1:
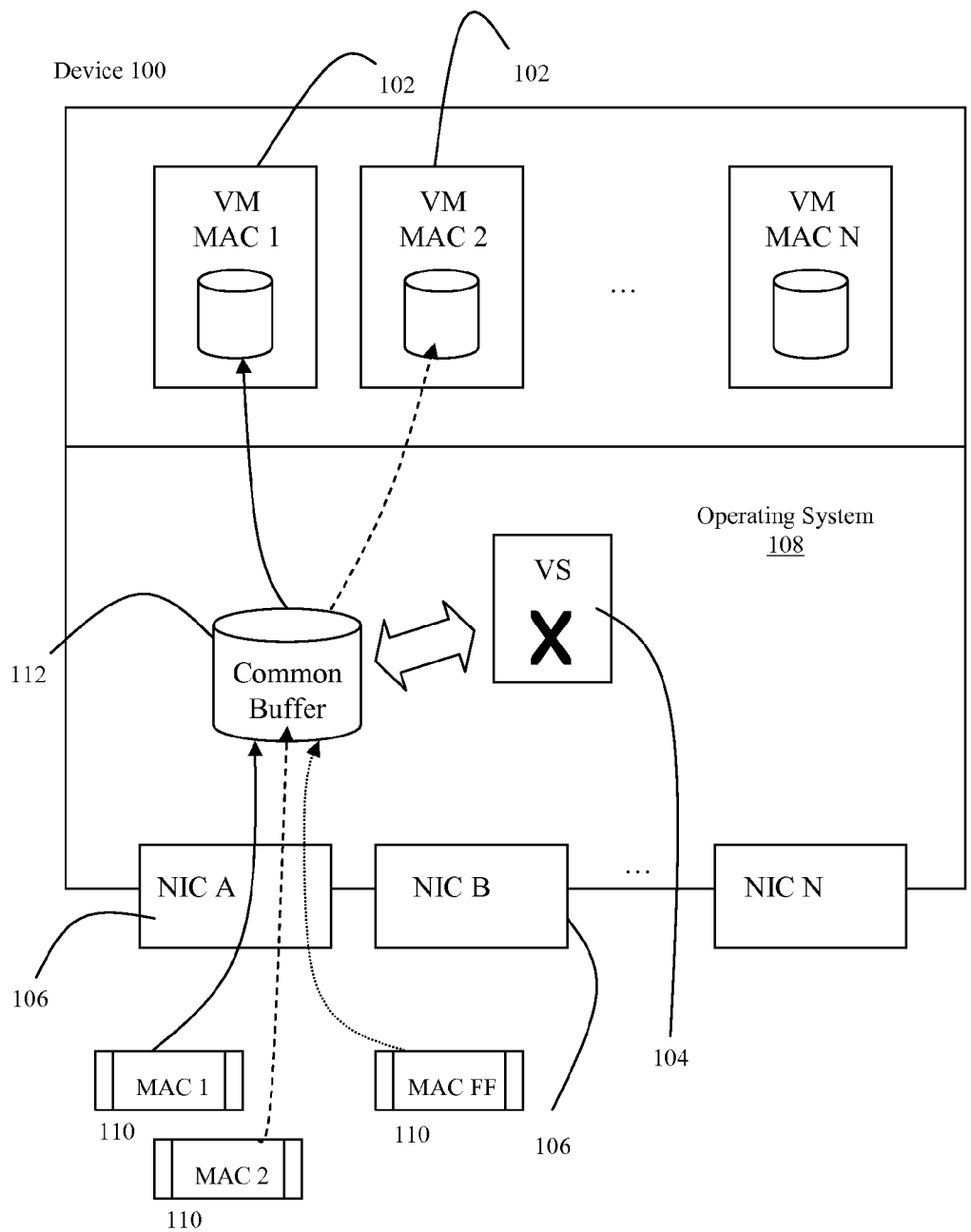
FIG. 1 illustrates a prior art Network Attached Storage (NAS) device.
Figure 2:
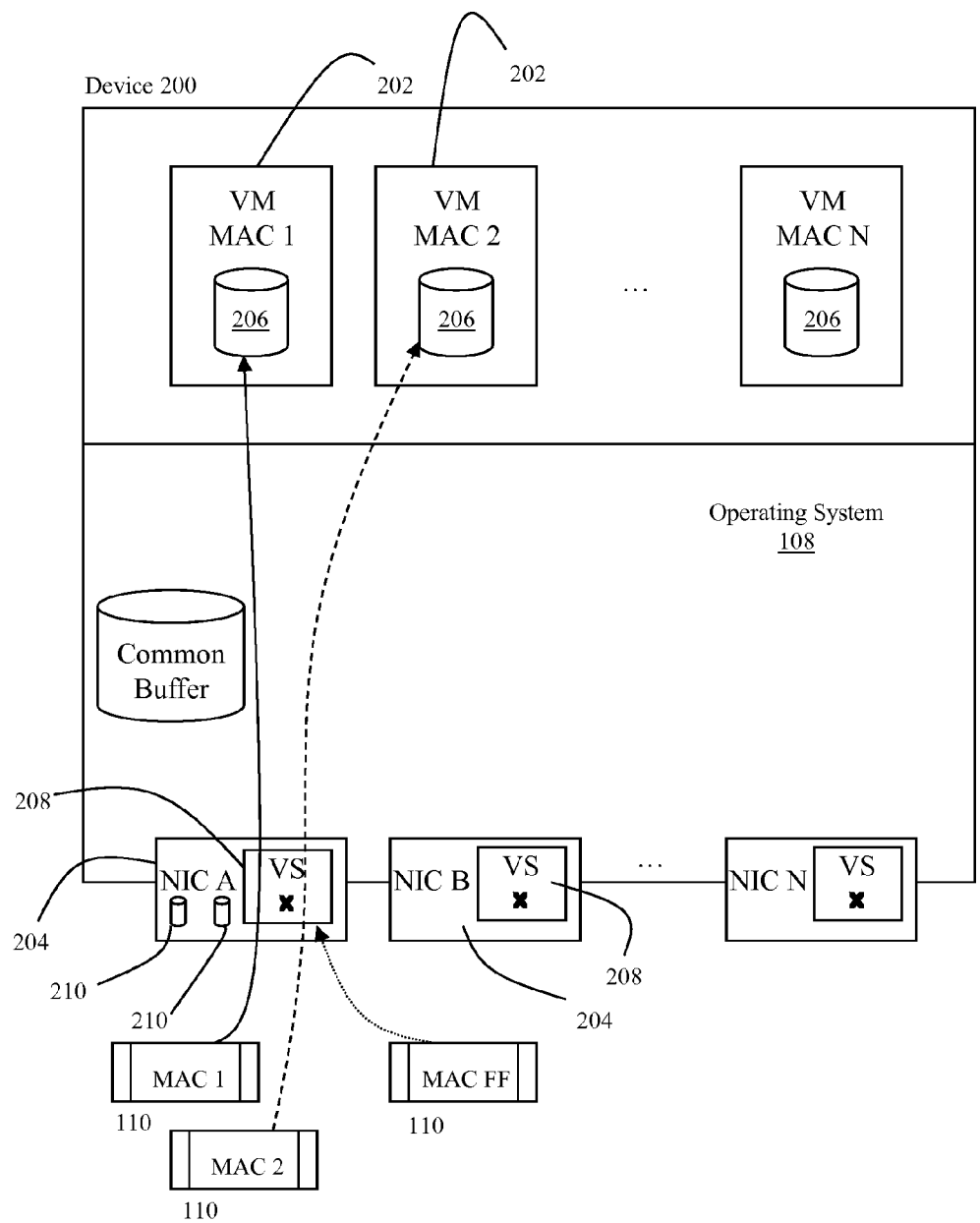
FIG. 2 illustrates a NAS device in accordance with in embodiment of the invention.

Referring to FIG. 2, in accordance with one embodiment of the invention a device (200) for supporting functions associated with NAS includes a plurality of virtual machines (202), each associated with a unique MAC address, and at least one Network Interface Card (NIC) (204). Each virtual machine (202) has a private pool of buffers (206) reserved for use with traffic associated with a particular MAC address (and thus, the VM, unless the VM is associated with multiple MAC addresses). Those skilled in the art will appreciate that the private pools of buffers may be associated with one or more shared physical memory resources. Each virtual machine (202) runs applications, e.g., NAS applications, under a particular guest operating system, e.g., RTOS, Linux or Windows. Each NIC (204), e.g., "NIC A," supports multiple MAC addresses and includes a virtual switch (208) which performs switching/routing and filtering operations. The virtual switch may be implemented in a device driver of the NIC, e.g., an Ethernet device driver.

The NIC (204) is configured in a selective receive mode. In particular, the virtual switch (208) of the NIC includes a filtering function which is utilized to avoid unnecessarily copying packets into a common memory buffer pool. The filtering function is provided with the MAC addresses of the virtual machines supported by the NIC. Those MAC addresses, or portions thereof, are compared with the MAC addresses specified in incoming packets (110) to determine whether the incoming packets are addressed to a supported virtual machine. Packets which specify a broadcast or multicast address are passed to the NIC device driver through the common buffer pool so they can be copied to all virtual machines associated with the virtual switch. Packets which specify a MAC address that is not associated with one of the virtual machines supported by the NIC are discarded without being forwarded to a common memory buffer pool.

Following the filtering operation described above, the virtual switch categorizes a received packet by destination MAC address and routes the packet to the appropriate virtual machine. Integration of the virtual switch (208) into the NIC (204) enhances this function by reducing the number of copying operations required to provide the packet (110) to the appropriate virtual machine (202). Routing/switching on the basis of MAC address, the virtual switch copies the categorized packet (110) directly to the memory (206) associated with the virtual machine (202) having the MAC address specified by the packet. In particular, the virtual switch performs a DMA operation by which the packet is copied to the private buffer pool associated with the MAC address (and thus virtual machine) to which the packet is addressed, possibly without assistance of the processor associated with the device.

Figure 3:
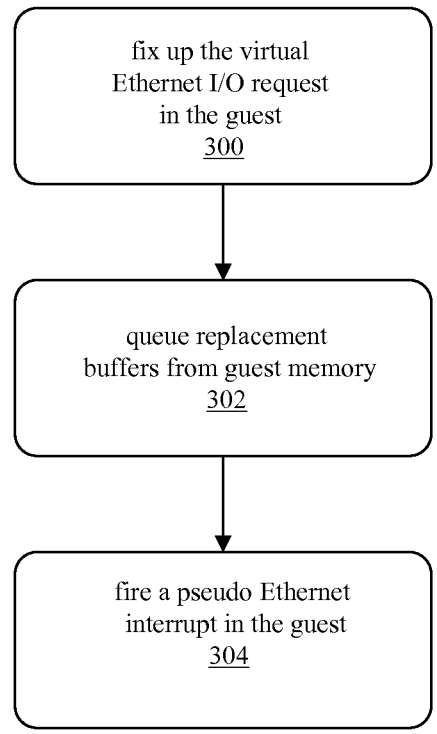
FIG. 3 is a flow diagram associated with one embodiment of the invention.

Referring to FIGS. 2 and 3, in one embodiment the NIC (204, NIC A) has a private pool of buffers (210) for each supported MAC address. Buffers allocated from within the virtual address space of the supported virtual machines (202) are queued to the NIC and associated with the MAC address of the virtual machine. When a packet is received, the host operating system (108) interrupt service may be invoked to perform the following functions:

step (300) fix up the virtual Ethernet I/O request in the guest operating system;
step (302) queue replacement buffers from guest memory (206); and
step (304) fire a pseudo Ethernet interrupt in the guest operating system.

Figure 4:
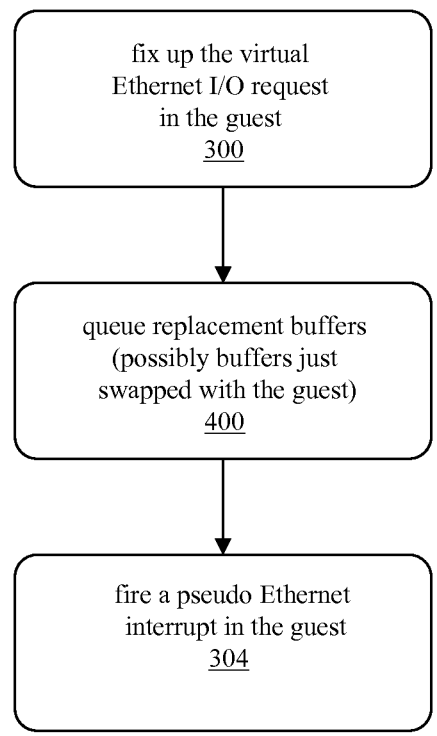
FIG. 4 is a flow diagram associated with an alternative embodiment of the invention.

Referring to FIGS. 2 and 4, in an alternative embodiment the association of a private pool of NIC (204, NIC B) buffers with a specific MAC address is simulated. Receive buffers in both the host operating system (108) and guest operating system (of the virtual machine) are allocated at page boundaries and occupy the entire page. When a packet is received, the host operating system interrupt service routine is invoked to perform the following functions:

step (300) fix up the virtual Ethernet I/O request in the guest by swapping page table entries;
step (400) queue replacement buffers (possibly buffers just swapped with the guest); and
step (304) fire a pseudo Ethernet interrupt in the guest.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus for use in a communications network comprising:
at least one processor providing a plurality of virtual machines, each virtual machine having dedicated memory and an address that is unique within a Local Area network; and
a network interface device responsive to receipt of a protocol data unit, including:
a simulated separate dedicated memory for each supported virtual machine;
a filter which discards the protocol data unit if the protocol data unit is not addressed to a supported virtual machine; and
a virtual switch which identifies a destination address specified by the protocol data unit if the protocol data unit is addressed to a supported virtual machine, and copies the protocol data unit directly from the network interface device dedicated memory associated with the supported virtual machine to the dedicated memory of the supported virtual machine to which the protocol data unit is addressed utilizing a direct memory access operation.

2. The apparatus of claim 1 wherein the filter uses a Media Access Control (MAC) address to identify protocol data units to be discarded.

3. The apparatus of claim 2 wherein the virtual switch is implemented in a device driver of a network interface card.

4. Computer program code stored on non-transitory computer readable media which is executed by a computer, comprising:
a plurality of virtual machines, each virtual machine having dedicated memory and an address that is unique within a Local Area network; and
on a network interface device responsive to receipt of a protocol data unit:
a simulated separate dedicated memory for each supported virtual machine;
a filter which discards the protocol data unit if the protocol data unit is not addressed to a supported virtual machine; and a virtual switch which identifies a destination address specified by the protocol data unit if the protocol data unit is addressed to a supported virtual machine, and copies the protocol data unit directly from the network interface device dedicated memory associated with the supported virtual machine to the dedicated memory of the supported virtual machine to which the protocol data unit is addressed utilizing a direct memory access operation.

5. The computer program code of claim 4 wherein the address used by the filter is a Media Access Control (MAC) address.

6. The computer program code of claim 5 wherein the virtual switch is implemented in a device driver of a network interface card.

7. A method for use in a communications network comprising:
   running a plurality of virtual machines on at least one processor, each virtual machine having dedicated memory and an address that is unique within a Local Area network; and
   with a network interface device switch, in response to receipt of a protocol data unit:
   using a virtual switch, identifying a destination address specified by the protocol data unit,
   using a filter, discarding the protocol data unit if the protocol data unit is not addressed to a virtual machine supported by the network interface device, and
   using a simulated separate dedicated memory for each supported virtual machine, if the protocol data unit is addressed to a virtual machine supported by the network interface device, copying the protocol data unit directly from the network interface device memory dedicated to the supported virtual machine to the dedicated memory of the supported virtual machine to which the protocol data unit is addressed utilizing a direct memory access operation.

8. The method of claim 7 including the further step of switching based on Media Access Control (MAC) address.

9. The method of claim 8 including the further step of implementing the virtual switch in a device driver of a network interface card.

\* \* \* \* \*